J. F. TOOMEY.
ELECTRICAL RELAY.
APPLICATION FILED JULY 9, 1919.

1,380,752.

Patented June 7, 1921.

INVENTOR.
J. F. Toomey
BY
ATTORNEY.

UNITED STATES PATENT OFFICE.

JOHN F. TOOMEY, OF NEW YORK, N. Y., ASSIGNOR TO AMERICAN TELEPHONE AND TELEGRAPH COMPANY, A CORPORATION OF NEW YORK.

ELECTRICAL RELAY.

1,380,752.  Specification of Letters Patent.  Patented June 7, 1921.

Application filed July 9, 1919. Serial No. 309,673.

*To all whom it may concern:*

Be it known that I, JOHN F. TOOMEY, residing at New York, in the county of New York and State of New York, have invented certain Improvements in Electrical Relays, of which the following is a specification.

This invention relates to circuit controlling devices and more particularly to relays or electro-magnetic means for exercising such control.

The arrangements of this invention are suitable for use in electrical systems, such as telephone and telegraph or other systems, in which it is desirable to utilize the electro-magnetic effect produced by current transmitted over one circuit to control a second circuit associated therewith; for example, for purposes of transmitting in magnified form over a circuit currents similar to attenuated currents coming in over an adjoining circuit, or for signaling, or many other purposes. It is the general purpose of the invention to provide a device for such purposes which will be simple in structure, of efficient operation, and of novel characteristics.

In the arrangements of this invention a receptacle containing metallic filings is associated with the extremity of a core about which are windings included in an electrical circuit. Contained in the receptacle and normally surrounded by the filings are contact points connected to conductors of another circuit, this circuit being completed between the contact points by means of the metallic filings. When a current is transmitted over the first circuit and an electro-magnetic effect produced thereby in the core, this action will have the effect on the filings of causing them to be removed from their normal position about the contact points thereby opening the second circuit, which circuit will again be closed when the filings are returned by gravity to their normal position upon the cessation of the current in the first circuit. By use of metallic filings of different kinds and by varying the position of the receptacle and contact points therein the electro-magnetic action produced by current in the first circuit may be utilized to primarily open or close the second circuit as desired. Other and further features of the invention will be clear from the detailed description of the invention.

Figure 1:
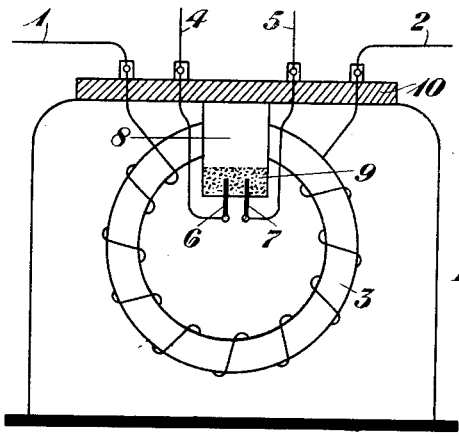
Figure 3:
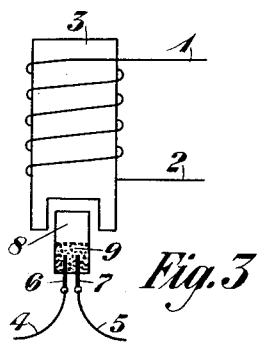
Figure 2:
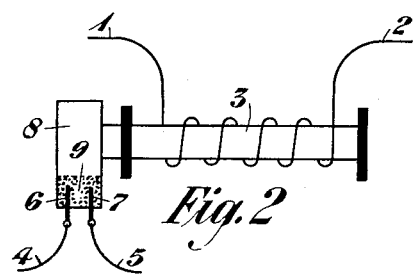
Figure 4:
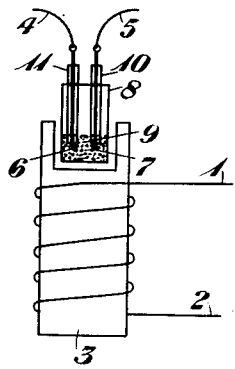

The invention may be more fully understood with reference to the accompanying drawing in the Figure 1 of which is illustrated a preferred form of the invention and in Figs. 2, 3, and 4 of which are shown modifications thereof. Similar reference numerals have been used to denote like parts in all of the figures of the drawing.

In Fig. 1 is shown a relay of the invention having a toroidal core 3. The winding of the relay is connected to terminals mounted on an insulated block 10 and to these terminals are attached conductors 1 and 2 of an electrical circuit. Conductors 4 and 5 of a second electrical circuit, which it is desired to control by the first circuit, are also connected to terminals mounted on block 10. To these last mentioned terminals are connected conductors terminating in the contact points 6 and 7. The contact points 6 and 7 are placed in a receptacle 8 placed in the gap between the extremities or poles of the core 3. The receptacle 8 contains metallic filings, such as iron filings or filings of any other suitable metal which have the properties of conducting electricity and being attracted by a magnet. The contacts and receptacle are so arranged that normally the metallic filings will be maintained by gravity about the contact points, and the filings and contact points are placed below the extremities or poles of the core. Normally the circuit including conductors 4 and 5 will be completed with this arrangement over the contact points 6 and 7 and the metallic filings. When a current of electricity is transmitted over conductors 1 and 2 of the first circuit and the core 3 is magnetized thereby the metallic filings will be attracted away from their normal position about the contact points 6 and 7 to the extremities or poles of the core. This action will open the second circuit which was completed over the contact points 6 and 7 and the filings. The second circuit will be completed again upon the cessation of the current in the first circuit and the demagnetization of core 3. Accordingly the arrangement provides a means for controlling the second circuit by means of the current transmitted over the first circuit.

In Figs. 2 and 3 are illustrated modifications of the relay in which a straight core may be used in place of a toroidal core. If the core is placed in a horizontal position, as in Fig. 2, the receptacle should be placed as shown at one of the extremities or poles of the core and in such a position that the filings will be maintained by gravity about the contact points and when attracted by the magnetic action of the core will be drawn away from the contact points and thereby open the second circuit. For similar purposes the receptacle and filings should be located as illustrated in Fig. 3 if it is found desirable to maintain the core of the relay in a vertical position.

In Fig. 4 is illustrated a further modification of the relay means which will operate only when alternating current is transmitted over conductors 1 and 2 of the first circuit, but will not operate with direct current. The receptacle 8 is placed as illustrated at one extremity of the core 3. The contact points 6 and 7 of the second circuit are covered except at their lower extremities with insulating material 10 and 11. The metallic filings in this arrangement are made of copper, which has the property of being repelled from a core in which an electro-magnetic action is produced by alternating current. The copper filings however, are not effected when the core is magnetized by direct current. Accordingly when alternating current is transmitted over conductors 1 and 2 of the first circuit the copper filings will be repelled from their normal position about the non-insulated portions of contact points 6 and 7 and will thereby open the circuit including conductors 4 and 5. When the transmission of alternating current over the first circuit has ceased the filings will be returned by gravity to a position about the non-insulated extremities of the contact points and the second circuit will be completed again. By inverting the receptacle 8 the alternating current in the first circuit may be utilized to close a normally open second circuit if desired. With this arrangement a relay means is provided for controlling a second circuit by current in a first circuit, and furthermore these relay means are capable of being connected in series with other relays in the circuit which operate only with direct current, in which case the operation of the relays of the circuit may be selectively accomplished by utilizing different kinds of current.

While the relay arrangements of this invention have been disclosed in certain specific arrangements which have been deemed desirable, it is understood that they are capable of embodiment in many and widely varied forms without departing from the spirit of the invention as defined in the appended claims.

What is claimed is:—

1. A receptacle containing a plurality of contact points and copper filings, said contact points being insulated except at their extremities and said filings being normally in a position around said non-insulated extremities, means to complete a circuit over said contact points and filings, a second circuit and means responsive to alternating current transmitted over said second circuit for producing an electro-magnetic action whereby said copper filings will be repelled from said non-insulated extremities and said first circuit opened.

2. A circuit including an electromagnet, a receptacle associated with the pole of said magnet, contact points included in said receptacle, a second circuit associated with said contact points, and a plurality of metallic filings in said receptacle, said metallic filings having such characteristics that when an alternating current is transmitted over said first circuit said metallic filings will be repelled from the pole of said magnet and will thereby control said second circuit.

3. An electromagnet, a receptacle associated with the pole thereof, contact points and metallic filings included in said receptacle, a circuit completed over said contact points, and means controlled by the repellent action on said metallic filings produced by an alternating electromagnetic force in said magnet for controlling said circuit.

In testimony whereof, I have signed my name to this specification this 8th day of July, 1919.

JOHN F. TOOMEY.